(12) United States Patent
Mosallanezhad et al.

(10) Patent No.: US 11,907,666 B2
(45) Date of Patent: Feb. 20, 2024

(54) SYSTEMS AND METHODS FOR UTILITY-PRESERVING DEEP REINFORCEMENT LEARNING-BASED TEXT ANONYMIZATION

(71) Applicants: Ahmadreza Mosallanezhad, Tempe, AZ (US); Ghazaleh Beigi, Tempe, AZ (US); Huan Liu, Tempe, AZ (US)

(72) Inventors: Ahmadreza Mosallanezhad, Tempe, AZ (US); Ghazaleh Beigi, Tempe, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 296 days.

(21) Appl. No.: 17/527,632

(22) Filed: Nov. 16, 2021

(65) Prior Publication Data
US 2022/0374606 A1    Nov. 24, 2022

Related U.S. Application Data

(60) Provisional application No. 63/114,285, filed on Nov. 16, 2020.

(51) Int. Cl.
*G06F 40/30* (2020.01)
*G06N 20/00* (2019.01)
*G06F 18/21* (2023.01)

(52) U.S. Cl.
CPC ............ *G06F 40/30* (2020.01); *G06F 18/217* (2023.01); *G06N 20/00* (2019.01)

(58) Field of Classification Search
CPC ........ G06F 40/30; G06F 18/217; G06N 20/00
See application file for complete search history.

(56) References Cited

U.S. PATENT DOCUMENTS

| | | | |
|---|---|---|---|
| 10,956,611 B2* | 3/2021 | Reilly | G06F 40/131 |
| 10,999,256 B2* | 5/2021 | Weggenmann | G06F 21/6254 |
| 2012/0239380 A1* | 9/2012 | Cumby | G06F 40/30 704/E11.001 |
| 2021/0150269 A1* | 5/2021 | Choudhury | G06V 30/1985 |
| 2021/0334455 A1* | 10/2021 | Gkoulalas-Divanis | G06F 40/216 |
| 2021/0342546 A1* | 11/2021 | Beigi | G06F 21/6245 |

OTHER PUBLICATIONS

Bo, Haohan, et al. "ER-AE: Differentially private text generation for authorship anonymization." arXiv preprint arXiv:1907.08736 (2019). (Year: 2019).*
Feyisetan, Oluwaseyi, Tom Diethe, and Thomas Drake. "Leveraging hierarchical representations for preserving privacy and utility in text." 2019 IEEE International Conference on Data Mining (ICDM). IEEE, 2019. (Year: 2019).*

(Continued)

*Primary Examiner* — Brian L Albertalli
(74) *Attorney, Agent, or Firm* — POLSINELLI PC (57) ABSTRACT

Various embodiments of a system and associated method for anonymization of text without losing semantic utility of text by extracting a latent embedding representation of content with respect to a given task and by learning an optimal strategy for text embedding manipulation to satisfy both privacy and utility requirements are disclosed herein. In particular, the system balances private attribute obfuscation with retained semantic utility.

20 Claims, 7 Drawing Sheets

(56) References Cited

OTHER PUBLICATIONS

Richard S Sutton and Andrew G Barto. 2018. Reinforcement learning: An introduction. MIT press.

Reza Zafarani, Mohammad Ali Abbasi, and Huan Liu. 2014. Social media mining: an introduction. Cambridge University Press.

Balamurugan Anandan, Chris Clifton, Wei Jiang, Mummoorthy Murugesan, Pedro Pastrana-Camacho, and Luo Si. 2012. t-plausibility: Generalizing words to desensitize text. Trans. Data Privacy, 5(3):505-534.

Ghazaleh Beigi, Kai Shu, Ruocheng Guo, Suhang Wang, and Huan Liu. 2019a. I am not what I write: Privacy preserving text representation learning. arXiv preprint arXiv:1907.03189.

Ghazaleh Beigi, Kai Shu, Ruocheng Guo, Suhang Wang, and Huan Liu. 2019b. Privacy preserving text representation learning. Proceedings of the 30th on Hypertext and Social Media (HT19). ACM.

Valentina Beretta, Daniele Maccagnola, Timothy Cribbin, and Enza Messina. 2015. An interactive method for inferring demographic attributes in twitter. In ACM Conference on Hypertext & Social Media.

Kyunghyun Cho, Bart Van Merrienboer, Caglar Gulcehre, Dzmitry Bandanau, Fethi Bougares, Holger Schwenk, and Yoshua Bengio. 2014. Learning phrase representations using mn encoder-decoder for statistical machine translation. arXiv preprint arXiv: 1406.1078.

Maximin Coavoux, Shashi Narayan, and Shay B Cohen. 2018. Privacy-preserving neural representations of text. arXiv preprint arXiv: 1808.09408.

George Cybenko. 1989. Approximation by superpositions of a sigmoidal function. Mathematics of control, signals and systems, 2(4):303-314.

Cynthia Dwork, Frank McSherry, Kobbi Nissim, and Adam Smith. 2017. Calibrating noise to sensitivity in private data analysis. Journal of Privacy and Confidentiality, 7(3): 17-51.

Briland Hitaj, Giuseppe Ateniese, and Fernando Perez-Cruz. 2017. Deep models under the gan: information leakage from collaborative deep learning. In Proceedings of the 2017 ACM SIGSAC Conference on Computer and Communications Security, pp. 603-618. ACM.

Dirk Hovy, Anders Johannsen, and Anders SOgaard. 2015. User review sites as a resource for large-scale sociolinguistic studies. In Proceedings of the 24th International Conference on World Wide Web.

Leslie Pack Kaelbling, Michael L Littman, and Andrew W Moore. 1996. Reinforcement learning: A survey. Journal of artificial intelligence research.

Man Lan, Sam-Yuan Sung, Hwee-Boon Low, and Chew-Lim Tan. 2005. A comparative study on term weighting schemes for text categorization. In IEEE International Joint Conference on Neural Networks.

Yitong Li, Timothy Baldwin, and Trevor Cohn. 2018. Towards robust and privacy-preserving text representations. In The 56th Annual Meeting of the Association for Computational Linguistics.

Marco Lui and Timothy Baldwin. 2012. langid. py: An off-the-shelf language identification tool. In Proceedings of the ACL 2012 system demonstrations.

Thang Luong, Hieu Pham, and Christopher D Manning. 2015. Effective approaches to attention-based neural machine translation. In Proceedings of the 2015 Conference on Empirical Methods in Natural Language Processing, pp. 1412-1421.

Volodymyr Mnih, Koray Kavukcuoglu, David Silver, Alex Graves, Ioannis Antonoglou, Daan Wierstra, and Martin Riedmiller. 2013. Playing atari with deep reinforcement learning. arXiv preprint arXiv: 1312.5602.

Arjun Mukherjee and Bing Liu. 2010. Improving gender classification of blog authors. In Empirical Methods in natural Language Processing (EMNLP).

Ramesh Nallapati, Bowen Zhou, Caglar Gulcehre, Bing Xiang, et al. 2016. Abstractive text summarization using sequence-to-sequence rnns and beyond. arXiv preprint arXiv: 1602.06023.

Greg Pass, Abdur Chowdhury, and Cayley Torgeson. 2006. A picture of search. In 1st international conference on Scalable information systems (InfoScale).

Romain Paulus, Caiming Xiong, and Richard Socher. 2017. A deep reinforced model for abstractive summarization. arXiv preprint arXiv:1705.04304.

Jeffrey Pennington, Richard Socher, and Christopher Manning. Glove: Global vectors for word representation. In Proceedings of conference on Empirical Methods in natural Language Processing (EMNLP) 2014.

Marc Aurelio Ranzato, Sumit Chopra, Michael Auli, and Wojciech Zaremba. 2015. Sequence level training with recurrent neural networks. arXiv preprint arXiv:1511.06732.

Yucel Saygin, Dilek Hakkini-Tur, and Goikhan Tur. 2006. Sanitization and anonymization of document repositories. In Web and information security.

Lifeng Shang, Zhengdong Lu, and Hang Li. 2015. Neural responding machine for short-text conversation. In Proceedings of the 53rd Annual Meeting of the Association for Computational Linguistics.

Zhan Shi, Xinchi Chen, Xipeng Qiu, and Xuanjing Huang. 2018. Toward diverse text generation with inverse reinforcement learning. In 27th International Joint Conference on Artificial Intelligence.

Yueming Sun and Yi Zhang. 2018. Conversational recommender system. In ACM SIGIR Conference on Research & Development in Information Retrieval.

Hado Van Hasselt, Arthur Guez, and David Silver. 2016. Deep reinforcement learning with double q-learning. In 30th AAAI Conference.

Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. In Advances in Neural Information Processing Systems, pp. 5998-6008.

Svitlana Volkova, Yoram Bachrach, Michael Armstrong, and Vijay Sharma. 2015. Inferring latent user properties from texts published in social media. In 29th AAAI Conference on Artificial Intelligence.

Jinxue Zhang, Jingchao Sun, Rui Zhang, Yanchao Zhang, and Xia Hu. 2018. Privacy-preserving social media data outsourcing. In IEEE INFOCOM Conference on Computer Communications.

\* cited by examiner

210 — ENCODE THE TEXTUAL DOCUMENT INTO THE TEXT EMBEDDING REPRESENTATION WITH RESPECT TO A GIVEN TASK

220 — APPLY, BY A COMPUTER-IMPLEMENTED LEARNING AGENT, AN ACTION TO A RANDOMLY SELECTED TEXT EMBEDDING REPRESENTATION OF A TEXTUAL DOCUMENT BASED ON A CURRENT STATE OF THE COMPUTER-IMPLEMENTED LEARNING AGENT AND AN EXPECTED RETURN

230 — UPDATE A REWARD VALUE FOR A NEW STATE, WHEREIN THE REWARD VALUE IS DETERMINED BASED ON A PRIVATE ATTRIBUTE CONFIDENCE OF A PRIVATE ATTRIBUTE CLASSIFIER COMPONENT AND A UTILITY CONFIDENCE OF A UTILITY CLASSIFIER COMPONENT

240 — OBTAIN A FINAL TEXT EMBEDDING REPRESENTATION THAT MAXIMIZES THE REWARD VALUE; THE FINAL TEXT EMBEDDING ANONYMIZES PRIVATE ATTRIBUTE INFORMATION AND PRESERVES SEMANTIC MEANING WITHIN THE TEXTUAL DOCUMENT

SYSTEMS AND METHODS FOR UTILITY-PRESERVING DEEP REINFORCEMENT LEARNING-BASED TEXT ANONYMIZATION

CROSS-REFERENCE TO RELATED APPLICATIONS

This is a non-provisional application that claims benefit to U.S. Provisional Patent Application Ser. No. 63/114,285 filed 16 Nov. 2020, which is herein incorporated by reference in its entirety.

GOVERNMENT SUPPORT

This invention was made with government support under grant number N00014-17-1-2605 awarded by the Office of Naval Research, W911NF-15-1-0328 awarded by the Army Research Office, and 1614576 awarded by the National Science Foundation. The Government has certain rights in the invention.

FIELD

The present disclosure generally relates to internet privacy and in particular to a system and associated method for deep reinforcement-learning text anonymization of private user information.

BACKGROUND

Social media users generate a tremendous amount of data such as profile information, network connections and online reviews and posts. Online vendors use this data to understand user preferences and further predict their future needs. However, user-generated data is rich in content and malicious attackers can infer users' sensitive information. An AOL search data leak in 2006 is an example of a privacy breach which resulted in users' re-identification, according to the published AOL search logs and queries. Therefore, these privacy concerns mandate that data be anonymized before publishing. Recent research has shown that textual data alone may contain sufficient information about users' private-attributes that they do not want to disclose such as age, gender, location, political views and sexual orientation. Little attention has been paid to protect users textual information Anonymizing textual information comes at the cost of losing utility of data for future applications and degrading quality of textual information. Another related problem setting is when a latent representation of the user-generated texts is shared for different tasks. It is very common to use recurrent neural networks to create a representation of user-generated text to use for different machine learning tasks, however it has been shown that text representations can still leak users' private information.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

Various embodiments of a system and associated method for anonym anonymization of users' textual information against private-attribute inference attacks are described herein. The present system leverages reinforcement learning to include feedback of attackers and utility in a reward function that allows for control of a privacy-utility balance associated with anonymization of textual information. Furthermore, a Reinforcement Learning (RL) software agent of the present system can perturb parts of an embedded text for preserving both utility and privacy, instead of re-training and embedding as is common in adversarial learning. Referring to the drawings, embodiments of a Reinforcement Learning-based Text Anonymizer (RLTA) system, herein after "the system" and corresponding methods are illustrated and generally indicated as 100 and 200 in FIGS. 1-7.

Figure 1:
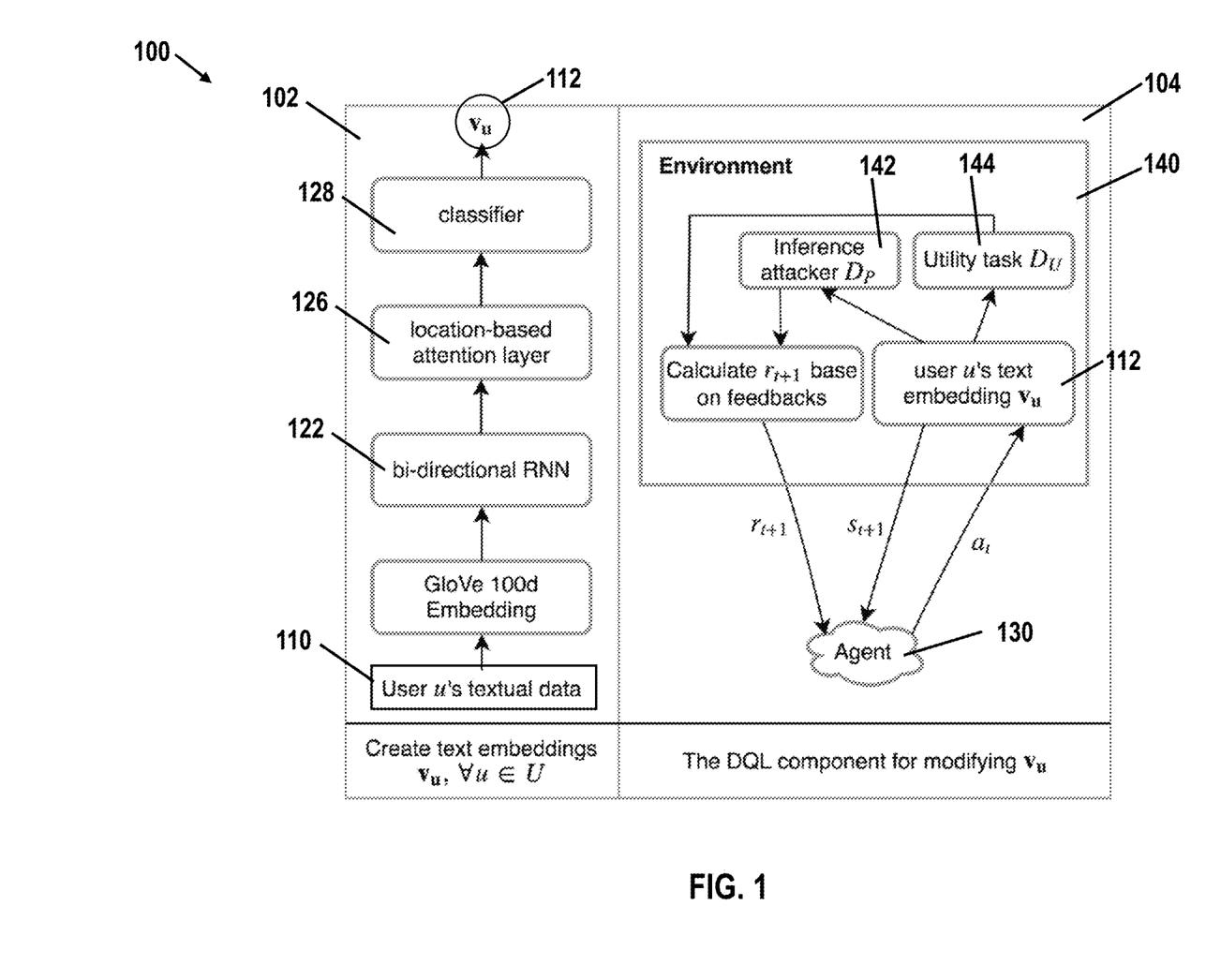
FIG. 1 is a diagram illustrating an architecture of a system for textual anonymization.

Referring to FIG. 1, the system 100 includes two main components: 1) an attention-based task-aware text representation learner 102 to extract a latent embedding representation of the original text's content with respect to a given task, and 2) a deep reinforcement learning-based privacy and utility preserver 104 (referred to herein as "Deep Q-Learning" or DQL) to convert the problem of text anonymization to a one-player Reinforcement Learning (RL) game in which a goal of a computer-implemented learning agent 130 of the system 100 is to learn the optimal strategy for manipulation of a text embedding representation 112 to satisfy both privacy and utility. The DQL is then used to train the computer-implemented learning agent 130 capable of changing the text embedding representation 112 with respect to the received feedback from the privacy and utility subcomponents.

The present disclosure investigates the following challenges:

1) How can one extract a textual embedding with respect to a given task?
2) How can one perturb the extracted text embedding to ensure that user private-attribute information is obscured?
3) How can one preserve the utility of text embedding during anonymization?

In this disclosure: (1) the problem of text anonymization is studied by learning a reinforced task-aware text anonymizer, (2) a data-utility task-aware checker is incorporated into the present system to ensure that the utility of textual embeddings is preserved with respect to a given task, and (3) experiments are conducted on real-world data to demonstrate the effectiveness of the system 100 in an important natural language processing task.

Problem Statement

Let $X=\{x_1, x_2, \ldots, x_N\}$ denote a set of N documents and each document $x_i$ is includes a sequence of words. $v_i \in \mathbb{R}^{d \times 1}$ is denoted as an embedded representation of the original document $x_i$. Let $P=\{p_1, p_2, \ldots, p_m\}$ denote a set of m private attributes that users do not want to disclose such as age, gender, location, etc. The goal of the reinforced task-aware text anonymizer is to learn a text embedding representation 112 of each document $x_i$ and then anonymize each document $x_i$ such that 1) users privacy is preserved by preventing any potential attacker from inferring users' private attribute information from the textual embedding data, and 2) utility of the text embedding representation 112 is maintained for a given task T which incorporates such data, e.g., classification.

Problem 3.1. Given a set of documents X, set of private-attributes P, and given task T, learn an anonymizer f that can learn a private embedded representation v from the original document x so that, 1) the adversary cannot infer the targeted user's private-attributes P from the private text representation $v_i$, and 2) the generated private representation $v_i$ is good for the given task T. The problem can be formally defined as:

$$v_i = f(x_i, \mathcal{P}, \mathcal{T}) \quad (1)$$

The system 100 uses Reinforcement Learning (RL) to address the aforementioned problem. RL formulates a problem within the framework of a Markov Decision Process (MDP) and learns an action-selection policy based on past observations of transition data. An MDP is defined by state space $S=\{s\}$, action space $A=\{a\}$, transition probability function $P: S \times A \times S \rightarrow [0,1]$ and reward function $r: S \times A \times S \rightarrow R$.

Method Overview

User-generated text is an input to the system 100, and an output is a privacy-preserving text representation. As shown in FIG. 1, the system 100 includes two major components: 1) the attention-based task-aware text representation learner 102, and 2) the deep RL-based privacy and utility preserver 104. The text representation learner 102 aims to extract an embedded representation of a document with respect to a given task by minimizing a loss function associated with the task. Then, the deep RL preserver 104 manipulates the embedded text representation by learning the optimal strategy so that both privacy and utility of the embedded representation are preserved. The deep RL preserver 104 includes two sub-components: 1) private attribute classifier component $D_P$ 142, and 2) task-aware utility classifier component $D_U$ 144. The private attribute classifier component 142 seeks to infer user private-attribute information based on their embedded text representation. The utility classifier component 144 incorporates the given manipulated embedded text representation for a given task T and investigates the usefulness of the latent representation for T.

The deep RL preserver 104 then utilizes feedback from the two sub-components 142 and 144 to guide the data manipulation process by ensuring that the new text embedding representation 112 does not leak user private-attributes by confusing the adversary in $D_P$ and the changes made to the representation does not destroy semantic meaning for task T.

Figure 2:
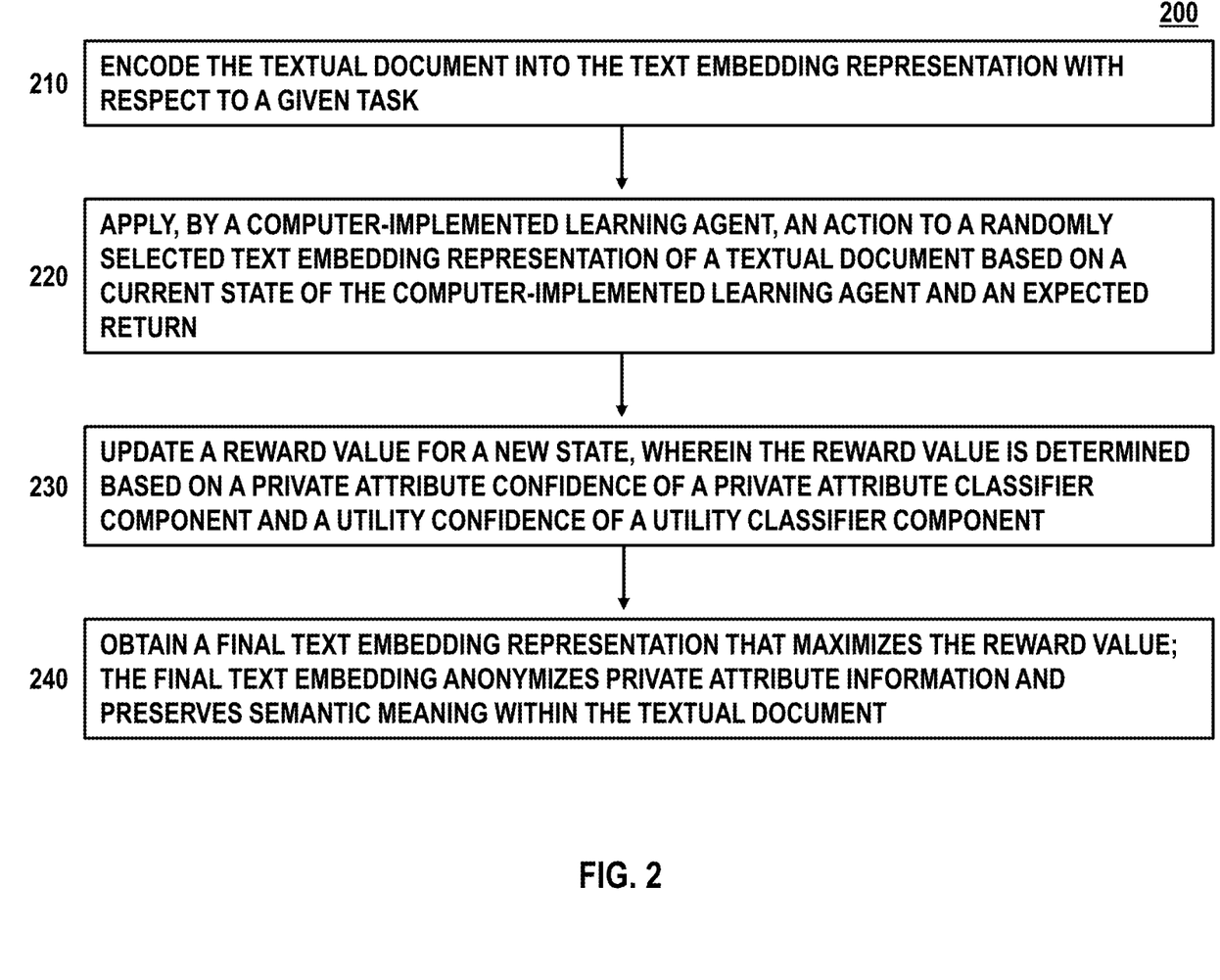
FIG. 2 is a process flow showing a computer-implemented method for textual anonymization.

Referring to FIG. 2, a process flow 200 outlining the above is illustrated. At block 210, the text representation learner 102 of the system 100 encodes the textual document into the text embedding representation 112 with respect to a given task. At block 220, the computer-implemented learning agent 130 of the system 100 applies an action $a_t$ to a randomly selected text embedding representation 112 of a textual document based on a current state of the computer-implemented learning agent 130 and an expected return. At block 230, the system 100 updates a reward value $r_{t+1}$ for a new state $s_{t+1}$, wherein the reward value is determined based on a private attribute confidence of a private attribute classifier component 142 and a utility confidence of a utility classifier component 144. Blocks 220 and 230 are iteratively repeated until a resultant final text embedding representation 112 that maximizes the reward value is achieved. At block 240, the system obtains the final text embedding representation 112 that maximizes the reward value by anonymizing private attribute information and preserving semantic meaning within the textual document.

Extracting Textual Embedding

Referring to the text representation learner 102, let $x=\{w_1, \ldots, w_m\}$ be a document with m words representative of textual data 110. An attention mechanism 126 is included to capture embedding of textual information from textual data 110 with respect to a given task, allowing the model to attend to different parts of the given original document at each step and then learns what to attend based on the input document x and what it has produced as embedding representation so far, as shown in FIG. 1.

A bi-directional recurrent neural network (RNN) 122 is used to encode the given document into an initial embedding representation. RNN has been shown to be effective for summarizing and learning semantic of unstructured noisy short texts. GloVe 100d 124 is used to exchange each word $w_i$ with its corresponding word vector, note that different dimensionality can be used. This process produces a matrix of text $x' \in \mathcal{R}^{m*100}$ A gated recurrent unit (GRU) is employed as a cell type to build the RNN 122, which is designed in a manner to have a more persistent memory. The bi-directional GRU will read the text forward and backwards, then outputs two hidden states $h_t^{fw}$, $h_t^{bw}$ and an output $o_t$. The system 100 then concatenates two hidden states as the initial encoded embedding of the given original document:

$$H_t = \text{Concat}(h_t^{fw}, h_t^{bw}) \quad (2)$$

After calculating the initial context vector $H_t$, the system 100 seeks to pinpoint specific information within the $H_t$, which helps a classifier 128 to predict the labels with higher confidence. The attention layer 126 calculates a vector $a_t$ including a weight for each element in the $H_t$, showing the importance of that element. The context vector $v_t$ is calculated:

$$v_t = \sum_{i=1}^{m} a_{t,i} H_i \qquad (3)$$

The vector $v_t$ indicative of a text embedding representation $v_u$ 112 for a particular user is then fed to one or more neural network-based classifiers 128 for the given utility task. Classification is one of the common tasks for textual data. Based on the output of the classifier 128 and loss function, the three networks are updated so that the output of the attention layer 126 is a useful context that can be used for a utility task.

Reinforced Task-Aware Text Anonymizer

Here, details of the deep RL privacy and utility preserver 104 which seeks to preserve privacy and utility are disclosed.

Protecting Private-Attributes

Textual information is rich in content and publishing textual embedding representation without proper anonymization leads to privacy breaches and revealing the private-attributes of an individual such as age, gender and location. It is thus essential to protect the textual information before publishing it. The goal of the privacy and utility preserver 104 is to manipulate learned embedded representations learned with component 102 such that any potential adversary cannot infer users' private-attribute information. However, a challenge is that the text anonymizer does not know the adversary's attack model. To address this challenge, private attribute classifier component $D_P$ 142 is incorporated into the text anonymizer. This private attribute classifier component $D_P$ 142 learns a classifier that can accurately identify the private information of users from their embedded text representations $v_u$ 112. The private attribute classifier component $D_P$ 142 is incorporated to understand how the textual embedded representation should be anonymized to obfuscate the private information.

This problem is modeled using an RL environment 140 to automatically learn how to anonymize the text representations with respect to the private attribute classifier component $D_P$ 142. In the RL utility preserver 104 of the system 100, an RL agent 130 is trained to change a randomly selected text embedding representation 112. Then, the RL agent 130 keeps interacting with the environment and changes the text embedding representation 112 accordingly based on its current state and received rewards so that the private-attribute inference attacker cannot correctly identify user's private-attribute information given this embedding. In this part, the main four parts of an RL environment are defined in the problem, i.e., environment, state, action and reward.

Environment: The RL environment 140 includes the private attribute classifier component $D_P$ 142 and the text embedding representation $v_u$ 112 from the text representation learner 102. Note that private attribute classifier component $D_P$ 142 can be trained beforehand.

State: The state describes the current situation. In this context, the state is the current text embedding representation vector $v_{u,t}$ which reflects the results of the RL agents' 130 actions on $v_u$ up to time t.

Actions: An action performed by the RL agent 130 is defined as selecting one element such as $v_{u,k}$ in text embedding vector $v_u = \{v_{u,1}, \ldots, v_{u,m}\}$ and changing it to a value near −1, 0 or 1. This results in 3·m actions where m is the size of the embedding vector.

Changing value to near 1: In this action, the RL agent 130 changes the value of $v_{u,k}$ to a value between 0.9 and 1.0. As $v_{u,k}$ will be multiplied by a classifier's weight, the output will be the weight as is. In another word, the value $v_{u,k}$ will become important to the classifier.

Changing value to near 0: In this action, the RL agent 130 changes $v_{u,k}$ to a value between −0.01 and 0.01. This action makes $v_{u,k}$ seem neutral and unimportant to a classifier as it will result in a 0 when multiplied by a weight.

Changing value to near −1: In this action, the RL agent 130 changes $v_{u,k}$ to a value between −1.0 and −0.9. This action will make $v_{u,k}$ important to a classifier, but, in a negative way.

Reward: Reward in the problem is defined based on how successfully the RL agent 130 obfuscated the private-attribute information against the attacker so far. In particular, the reward function was defined at state $s_{t+1}$ according to the confidence $C_{p_k}$ of private attribute classifier component 142 for private-attribute $p_k$ given the resultant text embedding representation 112 at state $s_{t+1}$, i.e., $v_{t+1}$. Considering the classifier's input data as $v_u$ and its correct label as i, the confidence for a multi-class classifier is defined as the difference between the probability of actual value of the private-attribute and the minimum probability of other values of the private-attribute:

$$C_{p_k} = Pr(l = i | v_u) - \max_{j \neq i} Pr(l = j | v_u) \qquad (4)$$

Where l indicates label. For each private-attribute attacker $p_k$, the confidence score $C_{p_k}$ is within the range [−1,1]. A positive value demonstrates that the attacker has predicted private-attribute accurately, and a negative value indicates that the attacker was not able to infer user's private-attribute. According to this definition, the reward will be positive if action at has caused information hiding and will be negative if the action at was not able to hide sensitive information. Having confidence of private-attribute inference attackers, reward function at state $s_{t+1}$ is defined as:

$$r_{t+1}(s_{t+1}) = - \sum_{p_k \in D_P} C_{p_k}(s_{t+1}) \qquad (5)$$

The reward $r_t$ is calculated according to the state $s_{t+1}$ which associated with the transition of agent from state $s_t$ after applying action $a_t$. Note that the goal of agent is to maximize the amount of received rewards so that the mean of rewards r over time $t \in [0,T]$ (T is the terminal time) will be positive and above 0.

Preserving Utility of Text Embedding

Thus far, this disclosure has discussed how the system 100 1) learns textual embeddings from the given original document with respect to the given task by text representation learner 102, and 2) prevent leakage of private-attribute information by developing the RL privacy and utility preserver 104 which incorporates a private attribute classifier component 142 and manipulates the initial given text embedding representation 112 accordingly to fool the attacker. However, data obfuscation comes at the cost of data utility loss. Utility is defined as the quality of the given data for a given task. Neglecting the utility of the text embedding representation 112 while manipulating it, may destroy the semantic meaning of the text data for the given task. Classification is one of the common tasks. In order to preserve the utility of data, it is necessary to ensure that preserving privacy of data does not destroy the semantic meaning of the text embedding representation 112 with respect to the given task. This challenge is approached by changing the agent's reward function with respect to the data utility. The utility checker component, i.e., utility classifier component $D_{u\_}$, 144 is added to the RL environment 140 to assess the quality of resultant embedding representation. The confidence of the utility classifier component 144 is used for the given task to measure the utility of the text embedding representation 112 using the text embedding representation vector $v_u$ the its correct label i.

$$C = Pr(l = i|v_u) - \min_j Pr(l = j|v_u) \qquad (6)$$

The RL agent 130 can then use the feedback from the utility classifier component 144 to make decision when taking actions. The reward function is thus modified in order to incorporate the confidence $C_{DU}$ of the utility classifier component 144. Reward function at state $S_{t-1}$ can be defined as:

$$r_{t+1}(s_{t+1}) = \alpha C_{D_U}(s_{t+1}) - (1-\alpha) \sum_{p_k \in D_P} C_{p_k}(s_{t+1}) - \mathcal{B} \qquad (7)$$

where $C_{DU}$ and $C_{pk}$ represent the confidence of utility classifier component 144 and private attribute classifier component 142, respectively. Moreover, B demonstrates a baseline reward which forces the agent to reach a minimum reward value. A contribution coefficient α also control the amount of contribution from both private attribute classifier component 142 and utility classifier component 144 in Eq. 7.

Optimization

Given the formulation of states and actions, the system 100 aims to learn the optimal strategy via manipulating text representations with respect to the private attribute classifier component 142 and utility classifier component 144 feedbacks. The text embedding representations 112 are manipulated by repeatedly choosing an action at given current state $s_t$, and then applying actions on a current state to transit to the new one $s_{t+1}$. The RL agent 130 then receives reward $r_{t+1}$, as a consequence of interacting with the environment. The goal of the RL agent 130 is to manipulate text embedding representation $v_{u,k}$ in a way that maximizes its reward according to Eq. 7. Moreover, the RL agent 130 updates its action selection policy $\pi(s)$ so that it can achieve the maximum reward over time.

The system 100 further uses Deep Q-Learning, which is a variant of Q-Learning. In Deep Q-Learning, the goal is to find the following function:

$$Q^*(s_t, a_t) = E_{s_{t+1}}[r_{t+1} + \gamma \max_{a'} Q^*(s_{t+1}, a')] \qquad (8)$$

where Q(s,a) corresponds to the Q-function for extracting actions and it is defined as the expected return based on state s and action a. Moreover, Q*(s,a) denotes the optimal action-value Q-function which has the maximum expected return using the optimal policy $\pi(s)$. Rewards are also discounted by a factor of γ per time step. The RL agent 130 keeps interacting with the environment until it reaches the terminal time T.

Since it is not feasible to estimate Q*(s,a) in Eq. 8, a function approximator is used to estimate the state-action value function $Q^*(s,a) \approx Q(s, a; \theta)$.

Algorithm 1 The Learning Process of RLTA

Require: v, $D_P$, $D_U$, α, γ, B, T.
1: Initialize replay memory M with size N
2: while training is not terminal do
3:     $s_t \leftarrow v$
4:     for t ∈ {0; 1, . . . , T} do
5:        Choose action $a_t$ using ϵ-greedy
6:        Perform $a_t$ on $s_t$ and get ($s_{t+1}$, $r_{t+1}$)
7:        M ← M + ($s_t$, $a_t$, $r_{t+1}$, $s_{t+1}$)
8:        $s_t \leftarrow s_{t+1}$
9:        Sample mini-batch b from memroy M
10:       for (s, a, s', r) ∈ b do
11:          Update DQN weights using Eq. 11
12:       end for
13:     end for
14: end while Given that neural networks are excellent function approximators, a deep neural network function approximator with parameters θ or a Deep Q-Network (DQN) is leveraged by minimizing the following:

$$L(\theta) = E_{s_t, a_t, r_{t+1}, s_{t+1}}[(\mathcal{Y} - Q(s,a;\theta))^2] \qquad (9)$$

in which y is the target for the current iteration:

$$y = E_{s_{t+1}}\left[r_{t+1} + \gamma \max_{a'} Q(s_{t+1}, a'; \theta^p)\right] \qquad (10)$$

$\theta^p$ is the parameters from the previous iteration. The DQN is updated according to the derivation of Eq. 9 with respect to the parameter θ:

$$\nabla_\theta L(\theta) = E_{s_t, a_t, r_{t+1}, s_{t+1}}\left[\left(r + \gamma \max_{a'} Q(s_{t+1}, a'; \theta^p) - Q(s_t, a_t; \theta)\right)\nabla_\theta Q(s_t, a_t; \theta)\right] \qquad (11)$$

Algorithm 1 (above) shows the optimization process.

Figure 3:
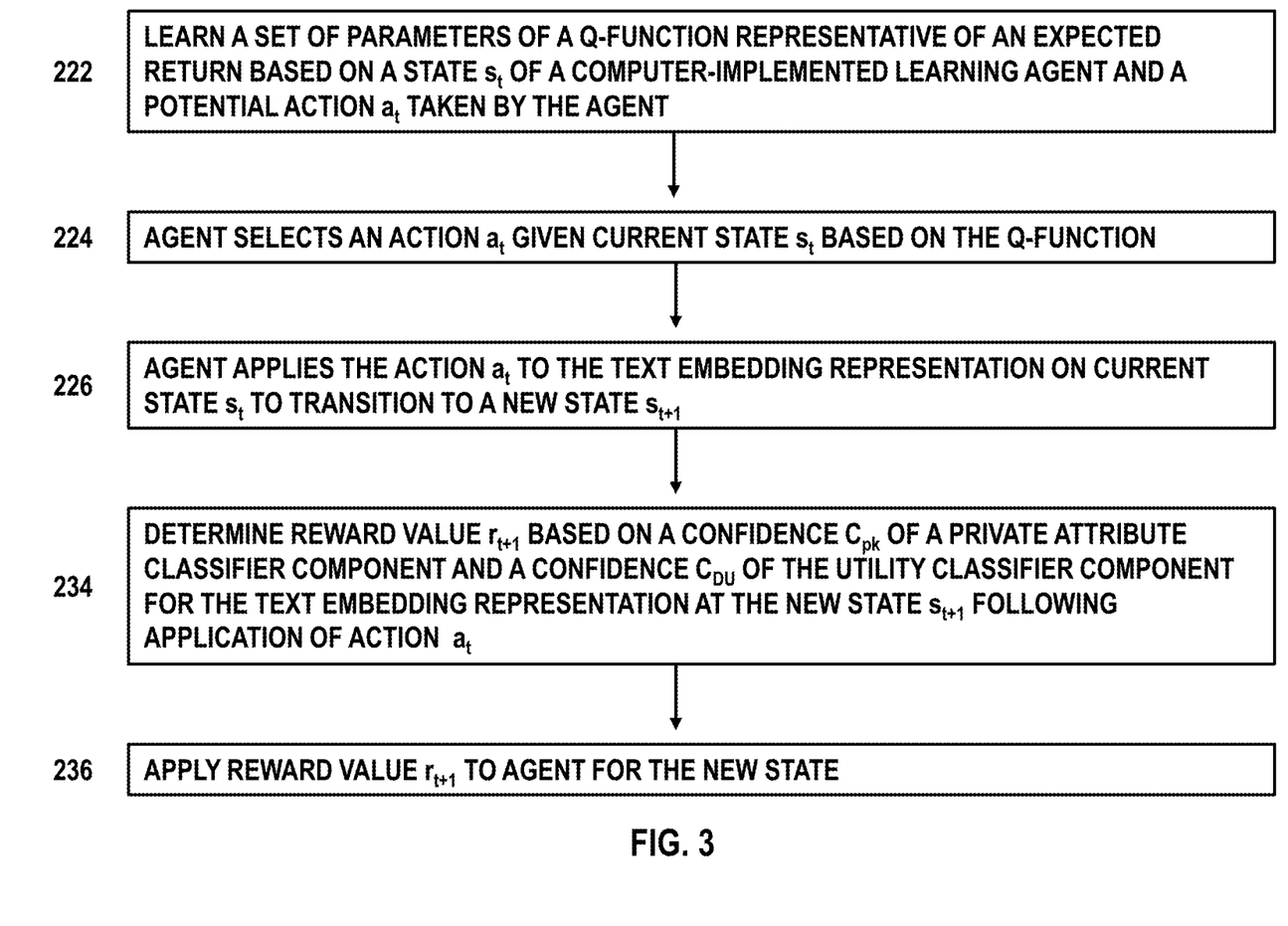
FIG. 3 is a process flow showing a computer-implemented method for textual anonymization including steps directed to an action applied to a text embedding representation by a computer-implemented agent of the present system.

Referring to FIG. 3, a sub-method is detailed elaborating on process flow 200 of FIG. 2. FIG. 3 elaborates on blocks 220 and 230 of process flow 200 to show how the computer-implemented learning agent 130 changes the text embedding representation 112 based on an expected return and a received reward value as is discussed above. At block 222 (a sub-block of block 220 of FIG. 2), the system 100 learns a set of parameters of the Q-function representative of an expected return based on the state st of the computer-implemented learning agent 130 and the potential action $a_t$ taken by the computer-implemented learning agent 130. At block 224 (a sub-block of block 220 of FIG. 2), the computer-implemented learning agent selects an action at given the current state $s_t$ based on the Q-function. At block 226, the computer-implemented learning agent applies the action $a_t$ to the text embedding representation 112 on the current state $s_t$ to transition to the new state $s_{t+1}$. At block 234 (a sub-block of block 230 of FIG. 2), the system 100 determines a reward value $r_{t+1}$ based on a confidence $C_{pk}$ of the private attribute classifier component 142 and a confidence $C_{DU}$ of the utility classifier component 144 for the text embedding representation 112 at the new state $s_{t+1}$ following application of action at. At block 236 (a sub-block of block 230 of FIG. 2), the system 100 applies the reward value $r_{t+1}$ to the computer-implemented agent 130 for the new state $s_{t+1}$.

Figure 4:
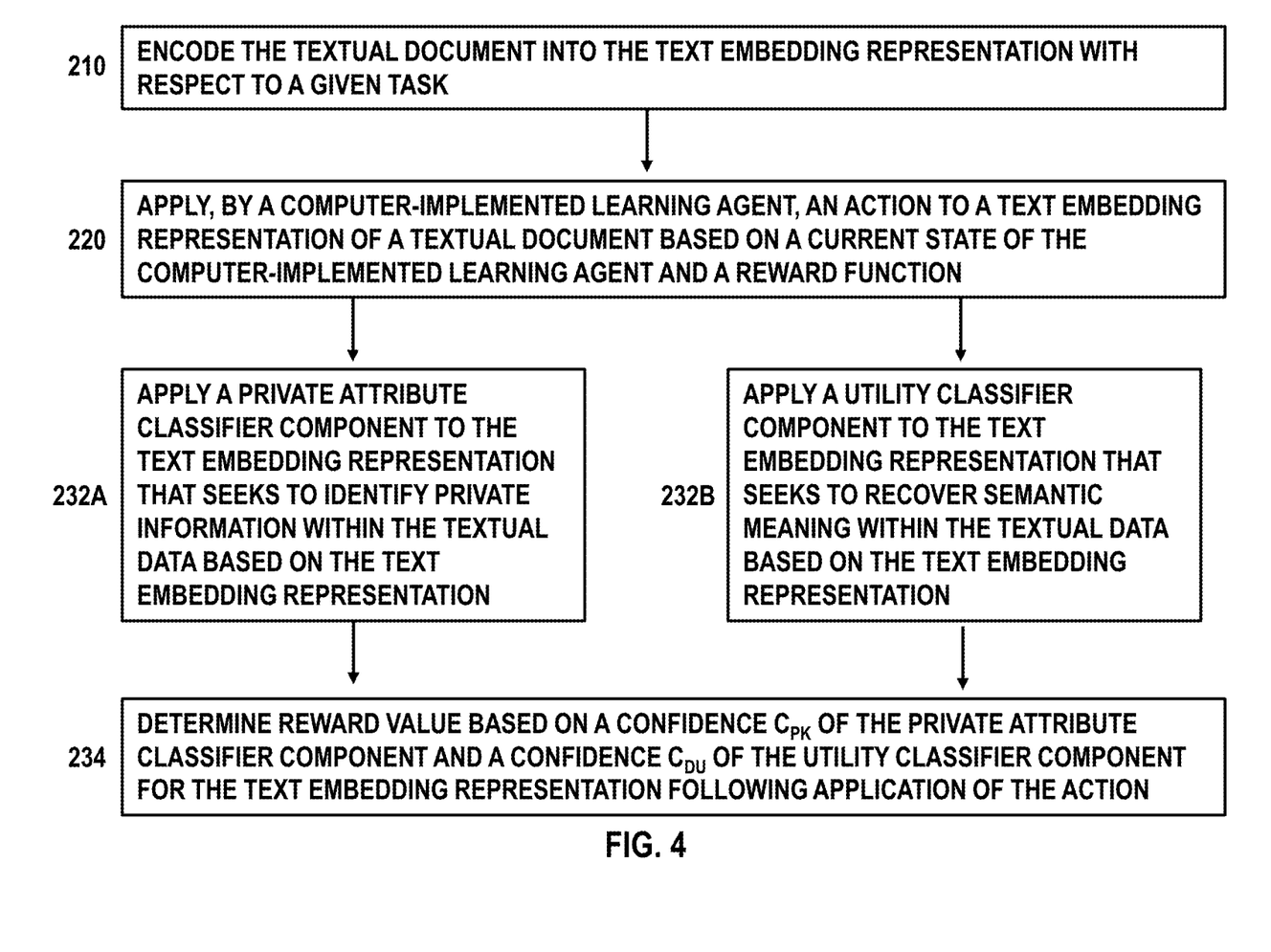
FIG. 4 is a process flow showing a computer-implemented method for assessing anonymization and semantic meaning recovery in a text embedding representation of the present system.

Referring to FIG. 4, a sub-method is detailed elaborating on process flow 200 of FIG. 2. After encoding the textual document into a text embedding representation 112 as discussed in block 210, and after applying the action at to the text embedding representation 112 as discussed in block 220, the system 100 evaluates private attribute anonymization and semantic utility of the text embedding representation 112. At block 232A, the system 100 applies the private attribute classifier component 142 to the text embedding representation 112 that seeks to identify private information within the textual data based on the text embedding representation 112. Simultaneously, at block 232B, the system 100 applies the utility classifier component 144 to the text embedding representation 112 that seeks to recover semantic meaning within textual data 110 based on the associated text embedding representation 112. At block 234, as discussed above, the system 100 determines the reward value $r_{t+1}$ based on a confidence $C_{pk}$ of the private attribute classifier component 142 and a confidence $C_{DU}$ of the utility classifier component 144 for the text embedding representation 112 following application of the action.

Experiments

Experiments are designed to answer the following questions: Q1 (Privacy): How well the system 100 can obscure users' private-attribute information? Q2 (Utility): How well the system 100 can preserve utility of the textual data 110 with respect to the given task? Q3 (Privacy-Utility Relation): How does improving user privacy affect loss of utility?

To answer the first question (Q1), the robustness of resultant text embedding is investigated against private-attribute inference attacks. Two types of private-attribute information are considered, i.e., location and gender. To answer the second question (Q2), experimental results are reported with respect to a well-known task, sentiment analysis. Sentiment analysis has many applications in user-behavioral modeling and Web. In particular, a sentiment of the given textual embedding is predicted to evaluate the system 100. To answer the final question (Q3), privacy improvement is examined against utility loss.

Data

A real-world dataset from Trustpilot is used. This dataset includes user reviews along with users private-attribute information such as location and gender. Non-English reviews were removed based on LANGID.py1 and only keep reviews classified as English. Then, English reviews associated with location of US and UK were considered and a subset of data with 10 k users was created. Each review is associated with a rating score. The review's sentiment is considered positive if its rating score is {4,5} and considered negative if their rating is {1,2,3}.

Implementation Details

For extracting the initial textual embedding, the bi-directional RNN 122 with hidden sizes is set to 25. This makes the size of the final hidden vector $H_t$ 50. A logistic regression with a linear network is also used as a classifier in the attention mechanism 126 associated with the text representation learner 102. A 3-layer network was used for the Deep Q-network, i.e., input, hidden and output layers. Dimensions of an input and hidden layers are set to 50 and 700, respectively. Dimension of a last layer, i.e., output, is also set as 150. The last layer outputs the state-action values and the action with the best value is executed.

For each of the private attribute classifier component 142 and utility classifier component 144, a feed-forward network with a single hidden layer (dimension of 100) is used, which gets the textual embedding as input and uses a Softmax function as output.

The private attribute classifier component $D_P$ 142 and utility classifier component $D_U$ 144 are first trained on the training set. These sub-components do not change after that. Then, the RL agent 130 is trained on each selected data for 5000 episodes. The reward discount for agents is $\gamma=0.99$ and batch size b=32. The terminal time was also set to T=25. The system 100 is run 5 times and the best RL agent 130 is selected based on the cumulative reward. $\alpha$ is also varied as $\alpha=\{0,0.25, 0.5,0.75,1\}$. The higher values of $\alpha$ indicate more utility contribution in the system 100.

Experimental Design

A 10-fold cross validation of the system 100 is used for evaluating both private attribute classifier component 142 and the utility classifier component 144 with the following baselines:

ORIGINAL: This baseline is a variant of the system 100 which does not change the original user text embedding representations $v_u$ and publishes it as is.

ADV-ALL: This adversarial method has two main components, i.e., generator and discriminator, and creates a text representation that has high quality for a given task, but has poor quality for inferring private-attributes.

ENC-DEC: Using an auto-encoder is an effective method to create a text embedding. This simple method is modified to create a privacy-preserving text embedding. This method gets the original text x and outputs a re-constructed text $\bar{x}$. The following loss function is used to train the model. After training, the encoder's output is used as the text embedding representation $v_u$ 112.

$$loss = -\sum_{x \in X} \log Pr(\bar{x} \mid x) + \alpha\left(\left(\sum_{p_k} C_{p_k}\right) - C_{D_U}\right) \quad (12)$$

In which a is the privacy budget.

Figure 5A:
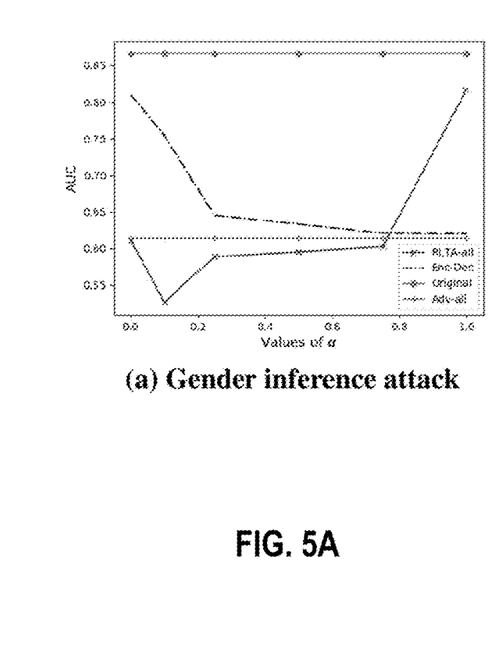
FIG. 5A is a graphical representation showing an "area under the ROC curve" (AUC) curve for the system of FIG. 1 responding to a gender-inference attack for different values of a contribution coefficient.

To examine the privacy of final text embedding, the trained private attribute classifier component $D_P$ 142 was applied to the output of each method to evaluate the users' privacy. Two private attributes were considered, i.e., location (FIG. 5B) and gender (FIG. 5A). The attacker's AUC was then computed. For an attacker, a lower AUC indicated that textual embeddings have higher privacy after anonymization against the private-attribute inference attacker. Experimental results with respect to the utility were also reported. In particular, sentiment (positive and negative) of the given textual embedding was predicted by applying trained utility classifier component $D_u$ 144 to the resultant text embedding from test set for each method. AUC score is then computed for sentiment prediction task (FIG. 5C). Higher values of AUC demonstrate that the utility of textual embedding has been preserved.

Experimental Results

The three questions Q1, Q2 and Q3 were answered to evaluate the present system 100. A natural language processing task, sentiment prediction, is executed using a three layer neural network.

Figure 5B:
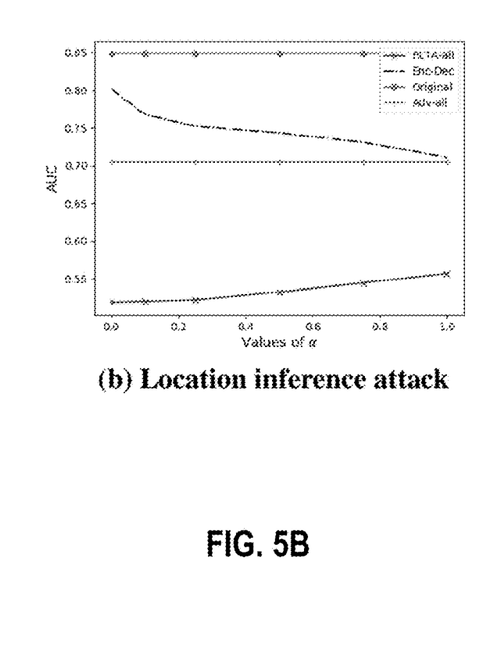
FIG. 5B is a graphical representation showing an "area under the ROC curve" (AUC) curve for the system of FIG. 1 responding to a location-inference attack for different values of different values of the contribution coefficient.
Figure 5C:
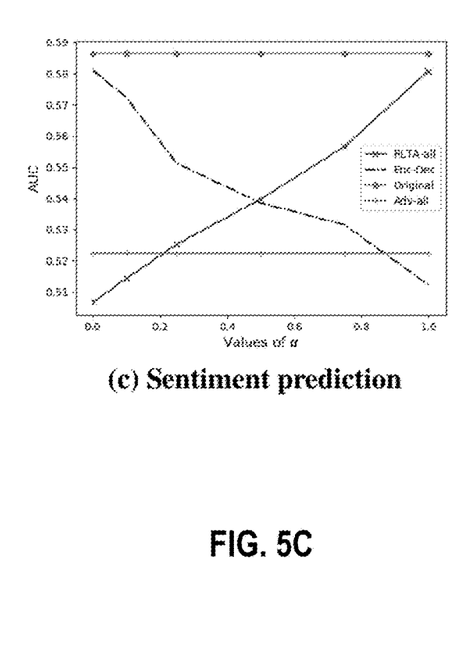
FIG. 5C is a graphical representation showing an "area under the ROC curve" (AUC) curve for the system of FIG. 1 for a sentiment prediction task for different values of different values of the contribution coefficient.

Privacy (Q1) FIGS. 5A and 5B demonstrate the results of private-attribute inference attack with respect to gender and location attributes. The lower the value of AUC is, the more privacy user has in terms of obscuring private attributes. The performance of the present system for different values of $\alpha$ was also reported.

It was observed that ORIGINAL was not robust against private-attribute inference attack for both gender and location attributes. This confirmed leakage of users private information from their textual data. Moreover, the present system 100 has a significantly lower AUC score for both gender and location attributes in comparison to other methods. This demonstrates the effectiveness of RL for obfuscating private attributes. In the present system 100, the AUC score for private-attribute inference attack increases for both attributes with the increase of $\alpha$ which shows the degradation in user privacy. The reason is because of the fact that the RL agent 130 pays less attention to privacy by increasing the value of $\alpha$.

In the ENC-DEC method, as the value of $\alpha$ increases, the encoder tries to generate a text representation that is prone to inference attacks but does not lose its utility with respect to the given task $D_U$. The results show that as $\alpha$ increases, the AUC of inference attackers will decrease.

Utility (Q2). To answer the second question, the utility of embeddings are investigated with respect to sentiment prediction. Results for different values of $\alpha$ are demonstrated in FIG. 5C. The higher the value of the AUC is, the more utility is preserved.

The ORIGINAL approach has the highest AUC score which shows the utility of the text embed-dings before any anonymization. It was observed that the results for the present system 100 are comparable to the ORIGINAL approach which shows that present system 100 preserves the utility of text embedding. Moreover, present system 100 outperformed ADV-ALL which confirms the effectiveness of reinforced task-aware text anonym anonymization approach in preserving utility of the textual embeddings. It was also observed that the AUC of present system 100 with respect to sentiment prediction task increased with the increase in value of $\alpha$. This is because with the increase of $\alpha$, the RL agent 130 pays more attention to the feedbacks of the utility classifier component 144.

A small utility loss was also observed after applying the present system 100 when $\alpha=1$. This is because the RL agent 130 keeps changing the text embedding until it reaches the terminal time. These changes result in loss of utility even when the $\alpha=1$.

Finally, in the ENC-DEC method, as both utility and attackers have the same importance, trying to preserving privacy would result in huge utility loss as we increase the value of $\alpha$.

Privacy-Utility Relation (Q3). Results show that the ORIGINAL achieves the highest AUC score for both the utility task and private-attribute inference attack. This shows that ORIGINAL has the highest utility which comes at the cost of significant user privacy loss. However, comparing results of privacy and utility for $\alpha=0.5$, was is observed that the present system 100 has achieved the lowest AUC. The present system 100 for attribute inference attacks in comparison to other baselines, thus has shown to have the highest privacy. It also reaches the higher utility level in comparison to the ADV-ALL. The present system 100 also has comparable utility results to the ORIGINAL approach. It was observed that increasing $\alpha$ reduces the performance of the present system 100 in terms of privacy but increases its performance for utility. However, with $\alpha=1$, the present system 100 preserves both user privacy and utility in comparison to ORIGINAL, ENC-DEC, and ADV-ALL.

Impact of Different Components

TABLE 1

Impact of different private-attribute inference attackers on RLTA when $\alpha = 0.5$. With $\alpha = 0.5$, privacy and utility will contribute equally.

| Method | Location | Gender | Utility |
| --- | --- | --- | --- |
| ORIGINAL | 84.77 | 86.54 | 58.57 |
| ENC-DEC | 71.55 | 58.35 | 53.78 |
| ADV-ALL | 70.37 | 57.15 | 52.15 |
| RLTA | 53.34 | 56.41 | 54.83 |
| RLTA-GEN | 56.64 | 55.02 | 56.67 |
| RLTA-LOC | 52.04 | 56.64 | 54.13 |

Here, the impact of different private-attribute inference attackers are investigated. Two embodiments of the present system 100 are defined, RLTA-GEN and RLTA-LOC. In each of these embodiments, an RL agent 130 is trained with respect to the private-attribute attackers, e.g., RLTA-GEN is trained to solely hide gender attribute. For this experiment $\alpha=0.5$ as in this case privacy and utility sub-components contribute equally during training phase (Eq. 7). Results are shown in Table 1.

RLTA-LOC and RLTA-GEN have the best performance amongst all methods in obfuscating location and gender private-attributes, respectively. Results show that using RLTA-LOC could also help improve privacy on gender and likewise for (RLTA-GEN) in comparison to other approaches. RLTA-GEN performs better in terms of utility, in comparison to the unaltered present system 100 which incorporates both gender and location attackers. Moreover, results show that both RLTA-GEN and RLTA-LOC have better utility than other baselines. To sum-up, these results indicate that although using one private-attribute attacker in the training process can help in preserving more utility, it can compromise obscuring other private-attributes.

Parameter Analysis: The present system 100 has an important parameter $\alpha$ to change the level of privacy and utility. The effect of this parameter is illustrated by varying as $\alpha \in \{0.0, 0.1, 0.25, 0.5, 0.75, 1.0\}$. As shown in FIGS. 5A-5C, when the $\alpha$ parameter increases, the privacy loss will decrease but the utility loss will increase. This shows the utility and the privacy have an association with each other.

Hence, the more privacy loss decreases, the utility loss increases. Choosing the right value for $\alpha$ depends on the application and usage of this method. According to the results, choosing $\alpha=0.5$ would result in a balanced privacy-utility. In some applications where the privacy of users are important and critical, the $\alpha$ parameter can be set above 0.5

On the other hand, if the users privacy is not top priority, this parameter can be set to a lower value than 0.5 which although it does not protect users' private attribute as good as when $\alpha>=0.5$, but it does protect users' private attribute at a reasonable level.

Rewards Convergence

Figure 6:
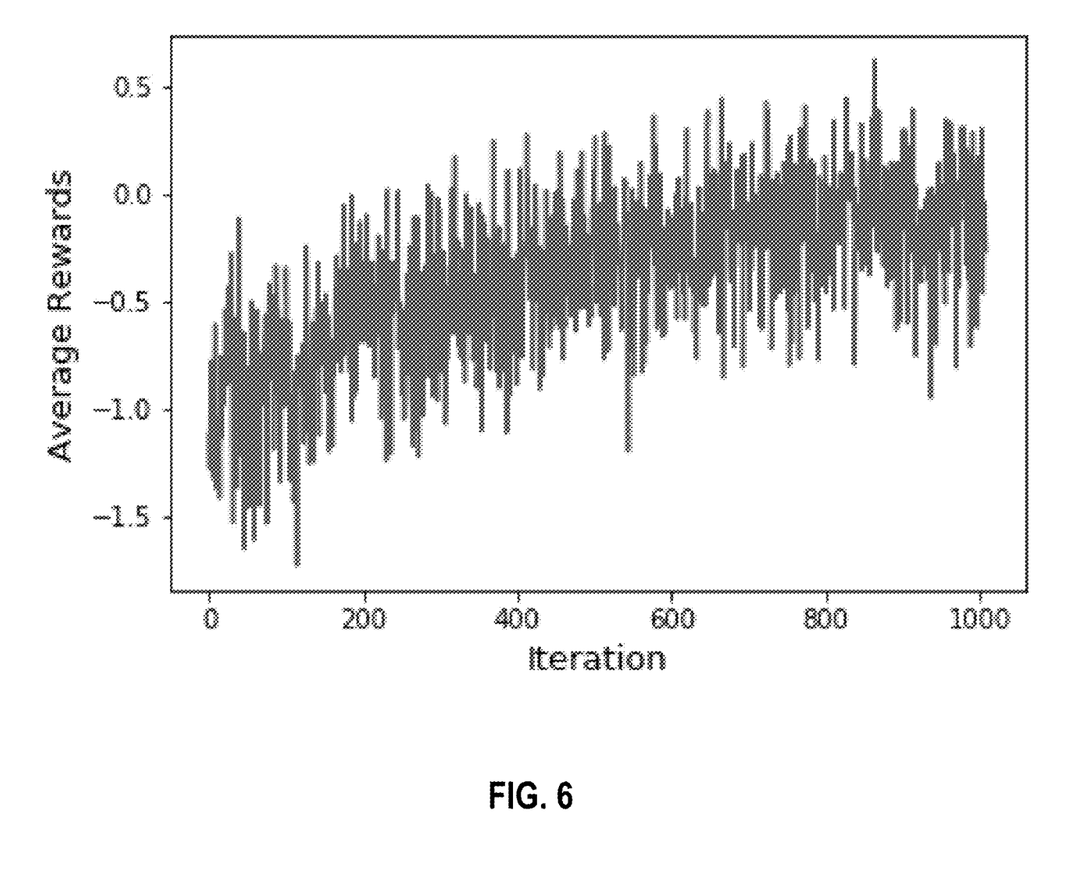
FIG. 6 is a graphical representation showing agent reward for the system of FIG. 1.

To evaluate the convergence of rewards, the reward of the RL agent 130 is considered during training phase for each episode, as shown in FIG. 6. The result indicates that for the RL agent 130, an average reward is low at the beginning and then it increases afterward. This is because the RL agent 130 performs many random actions at the beginning to explore the action state space. It is also observed that after several episodes, the reward converges to the baseline reward B. This confirms that the RL agent 130 has learned a proper action selection policy $\pi(s)$ to preserve both utility and privacy by satisfying the objectives of Eq. 7.

Conclusion

In this disclosure, a deep reinforcement learning-based text anonymization system 100 which creates a text embedding such that does user's private-attribute information remains private while preserving utility with respect to a given task. The present system 100 includes two main components: (1) the attention based task-aware text representation learner 102, and (2) the deep RL based privacy and utility preserver 104 which includes an RL agent 130. Deep Q-learning is also adopted to train the RL agent 130. Results illustrate the effectiveness of the present system 100 in preserving privacy and utility. Process flow 200 of FIGS. 2-4 further illustrate these concepts.

Computer-Implemented System

Figure 7:
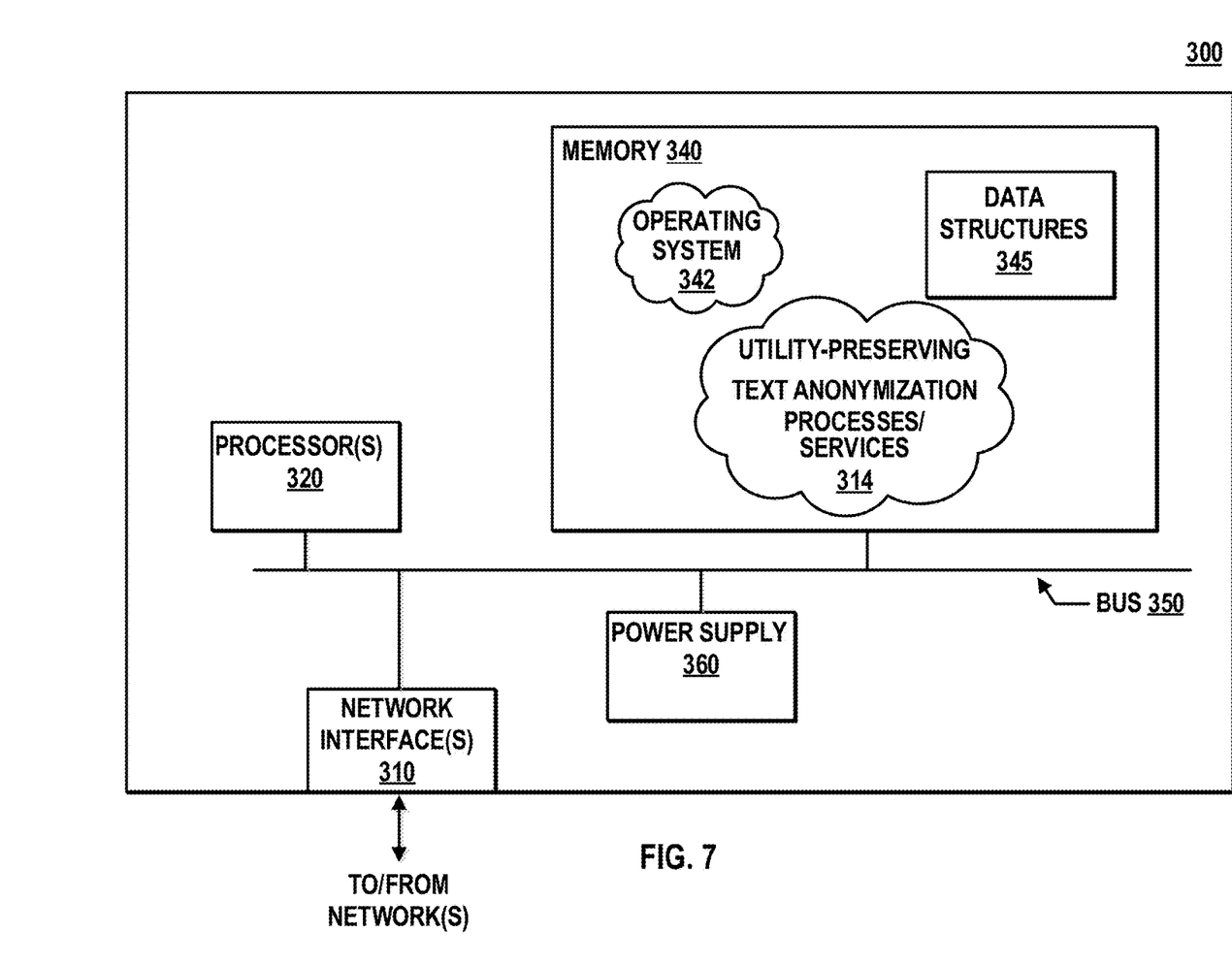
FIG. 7 is a simplified diagram showing an exemplary computing system for implementation of the system of FIG. 1.

FIG. 7 is a schematic block diagram of an example device 300 that may be used with one or more embodiments described herein, e.g., as a component of system 100 shown in FIG. 1.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include utility-preserving text anonymization processes/services 314 described herein. Note that while utility-preserving text anonymization processes/services 314 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the utility-preserving text anonymization processes/services 314 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system, comprising:
   a processor in communication with a memory, the memory including instructions which, when executed, cause the processor to:
   iteratively apply, by a computer-implemented learning agent, an action to a randomly selected text embedding representation of a textual document based on a current state of the computer-implemented learning agent and an expected return; and
   iteratively update a reward value for a new state, wherein the reward value is determined based on a private attribute confidence of a private attribute classifier component and a utility confidence of a utility classifier component;
   wherein the computer-implemented learning agent seeks to apply the action to the randomly selected text embedding such that the reward value is maximized as the private attribute confidence is minimized and the utility confidence is maximized.

2. The system of claim 1, wherein the memory further includes instructions, which, when executed, cause the processor to:
  encode the textual document into the text embedding representation with respect to a given task.

3. The system of claim 2, wherein the memory further includes instructions, which, when executed, cause the processor to:
  exchange each word of a plurality of words within the textual document with a corresponding word vector of a plurality of word vectors;
  read, by a gated recurrent unit of a recurrent neural network, the plurality of word vectors representative of the textual document in a first direction and a second direction to obtain a first hidden state taken from the first direction and a second hidden state taken from the second direction;
  concatenate the first and second hidden states to generate an initial context vector representative of the textual document.

4. The system of claim 3, wherein the memory further includes instructions, which, when executed, cause the processor to:
  apply a location-based attention layer to each element in the initial context vector to produce an attention-weighted context vector of the text embedding representation.

5. The system of claim 1, wherein the action comprises manipulating the text embedding representation to obfuscate information within the text embedding representation.

6. The system of claim 1, wherein the memory further includes instructions, which, when executed, cause the processor to:
  select, by the computer-implemented learning agent, an action given a current state based on a Q-function representative of an expected return based on the current state and the action.

7. The system of claim 6, wherein the memory further includes instructions, which, when executed, cause the processor to:
  learn a set of parameters of the Q-function using a Deep Q-learning method.

8. The system of claim 1, wherein the memory further includes instructions, which, when executed, cause the processor to:
  apply a private attribute classifier component to the text embedding representation; and
  obtain the private attribute confidence corresponding to a confidence of recovered private attributes from the text embedding representation following application of the private attribute classifier component to the text embedding representation;
  wherein the private attribute classifier component is configured to learn a classifier that accurately identifies private information within the text embedding representation.

9. The system of claim 1, wherein the memory further includes instructions, which, when executed, cause the processor to:
  apply a utility classifier component to the text embedding representation, wherein the utility classifier component is configured to assess a quality of the semantic meaning of the text embedding representation; and
  obtain the utility confidence corresponding to a confidence of recovered semantic meaning from the text embedding representation.

10. The system of claim 1, wherein the memory further includes instructions, which, when executed, cause the processor to:
  obtain a final text embedding representation that maximizes the reward function, wherein the final text embedding anonymizes private attribute information and preserves semantic meaning within the textual document.

11. A method, comprising:
  iteratively applying, by a computer-implemented learning agent, an action to a randomly selected text embedding representation of a textual document based on a current state of the computer-implemented learning agent and an expected reward; and
  iteratively updating a reward value for a new state, wherein the reward value is determined based on a private attribute confidence of a private attribute classifier component and a utility confidence of a utility classifier component;
  wherein the computer-implemented learning agent seeks to apply the action to the randomly selected text embedding such that the reward value is maximized as the private attribute confidence is minimized and the utility confidence is maximized.

12. The method of claim 11, further comprising:
  encoding the textual document into the text embedding representation with respect to a given task.

13. The method of claim 12, further comprising:
  exchanging each word of a plurality of words within the textual document with a corresponding word vector of a plurality of word vectors;
  reading, by a gated recurrent unit of a recurrent neural network, the plurality of word vectors representative of the textual document in a first direction and a second direction to obtain a first hidden state taken from the first direction and a second hidden state taken from the second direction;
  concatenating the first and second hidden states to generate an initial context vector representative of the textual document.

14. The method of claim 13, further comprising:
  applying a location-based attention layer to each element in the initial context vector to produce an attention-weighted context vector of the text embedding representation.

15. The method of claim 11, wherein the action comprises manipulating the text embedding representation to obfuscate information within the text embedding representation.

16. The method of claim 11, wherein the computer-implemented learning agent selects an action given a current state based on a Q-function representative of an expected reward based on the current state and the action.

17. The method of claim 16, further comprising:
  learning a set of parameters of the Q-function using a Deep Q-learning method.

18. The method of claim 11, further comprising:
  applying a private attribute classifier component to the text embedding representation; and
  obtaining the private attribute confidence corresponding to a confidence of recovered private attributes from the text embedding representation following application of the private attribute classifier component to the text embedding representation;
  wherein the private attribute classifier component is configured to learn a classifier that accurately identifies private information within the text embedding representation.

19. The method of claim 11, further comprising:
applying a utility classifier component to the text embedding representation, wherein the utility classifier component is configured to assess a quality of the semantic meaning of the text embedding representation; and
obtaining the utility confidence corresponding to a confidence of recovered semantic meaning from the text embedding representation.

20. The method of claim 11, further comprising:
obtaining a final text embedding representation that maximizes the reward function, wherein the final text embedding anonymizes private attribute information and preserves semantic meaning within the textual document.

* * * * *

UNITED STATES PATENT AND TRADEMARK OFFICE
CERTIFICATE OF CORRECTION

Page 1 of 1

PATENT NO. : 11,907,666 B2
APPLICATION NO. : 17/527632
DATED : February 20, 2024
INVENTOR(S) : Ahmadreza Mosallanezhad et al.

It is certified that error appears in the above-identified patent and that said Letters Patent is hereby corrected as shown below:

In the Specification

Column 1, Lines 16-22, "This invention was made with government support under grant number N00014-17-1-2605 awarded by the Office of Naval Research, W911NF-15-1-0328 awarded by the Army Research Office, and 1614576 awarded by the National Science Foundation. The Government has certain rights in the invention."

Should be --This invention was made with government support under 1614576 awarded by the National Science Foundation, N00014-21-1-4002 awarded by the Office of Naval Research and W911NF-15-1-0328 awarded by the Army Research Office. The government has certain rights in the invention.--

Signed and Sealed this
Twenty-third Day of April, 2024

Katherine Kelly Vidal
*Director of the United States Patent and Trademark Office*